US008655847B2

(12) United States Patent
Kamra et al.

(10) Patent No.: US 8,655,847 B2
(45) Date of Patent: Feb. 18, 2014

(54) MIRRORING DATA CHANGES IN A DATABASE SYSTEM

(75) Inventors: Vaibhav Kamra, Seattle, WA (US); Pradeep Madhavarapu, Kirkland, WA (US); Cristian Diaconu, Redmond, WA (US); Priyank Porwal, Redmond, WA (US); Jun Fang, Sammamish, WA (US); Srini Acharya, Sammamish, WA (US); Alexandru Chirica, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 276 days.

(21) Appl. No.: 12/856,688

(22) Filed: Aug. 16, 2010

(65) Prior Publication Data

US 2012/0041928 A1 Feb. 16, 2012

(51) Int. Cl.
*G06F 17/00* (2006.01)
*G06F 17/30* (2006.01)

(52) U.S. Cl.
USPC ............ 707/659; 707/640; 707/655; 711/162

(58) Field of Classification Search
USPC ........................................................ 707/659
See application file for complete search history.

(56) References Cited

U.S. PATENT DOCUMENTS

| 5,692,178 | A | 11/1997 | Shaughnessy |
| 6,023,706 | A | 2/2000 | Schmuck et al. |
| 7,457,880 | B1 | 11/2008 | Kim |
| 7,606,844 | B2 * | 10/2009 | Kottomtharayil ..................... 1/1 |
| 7,651,593 | B2 * | 1/2010 | Prahlad et al. ................ 202/204 |
| 2004/0133652 | A1 | 7/2004 | Miloushev et al. |
| 2009/0164468 | A1 | 6/2009 | Cornwell et al. |
| 2011/0282850 | A1 | 11/2011 | Kamra |

FOREIGN PATENT DOCUMENTS

WO 0233575 A2 4/2002

OTHER PUBLICATIONS

U.S. Appl. No. 12/777,272, Final Office Action mailed Apr. 17, 2012, 21 pages.
U.S. Appl. No. 12/777,272, Amendment filed Jul. 17, 2012, 14 pages.
U.S. Appl. No. 12/777,272, Office Action mailed Dec. 21, 2011, 16 pages.
U.S. Appl. No. 12/777,272, Amendment filed Mar. 21, 2012, 13 pages.
"Optimizing Data Replication: How Juniper Networks Accelerates VERITAS Volume Replicator", Retrieved at << http://www.juniper.net/solutions/literature/solutionbriefs/351126.pdf >>, Feb. 2007, pp. 1-7.

(Continued)

*Primary Examiner* — Yicun Wu
(74) *Attorney, Agent, or Firm* — Nicholas Chen; Kate Drakos; Micky Minhas (57) ABSTRACT

A method for mirroring one or more data changes from a first database server to one or more second database servers. The method includes intercepting one or more operations that make one or more changes to one or more data on the first database server. After intercepting these operations, the method merges the operations into one or more chunks, adds one or more log records having the chunks into a database log. The database log includes one or more database log blocks. The method then writes the database log blocks.

16 Claims, 5 Drawing Sheets

(56) References Cited

OTHER PUBLICATIONS

Thomas, Juergen., "SAP with Microsoft SQL Server 2005: Best Practices for High Availability, Maximum Performance, and Scalability", Retrieved at << http://download.microsoft.com/download/d/9/4/d948f981-926e-40faa026-5bfcf076d9b9/SAP_SQL2005_Best%20Practices.doc >>, Jun. 30, 2006, pp. 100.

Novik, et al., "Peer-to-Peer Replication in WinFS", Retrieved at << ftp://ftp.research.microsoft.com/pub/tr/TR-2006-78.pdf >>, TechReport, No. MSR-TR-2006-78, Jun. 2006, pp. 1-17.

Vacaliuc, Bogdan., "Implementation of Concurrent Access to File Systems in USB Devices", Retrieved at << http://www.ngit.com/staff/bvacaliuc_gspx04.pdf >>, Sep. 2004, pp. 1-6.

"Developing File System Mini-Filters for Windows", Retrieved at http://www.osr.com/filters.pdf >>, Retrieved Date: Jan. 29, 2010, pp. 1-4.

Nurmela, Tuomas., "Combining High-Availability and Disaster Recovery: Implementing Oracle Maximum Availability Architecture (MAA) on Oracle 10gR2 RDBMS", Retrieved at << http://www.cs.helsinki.fi/u/jplindst/ps/nurmela_MAA.pdf>>, Retrieved Date: Jan. 29, 2010, pp. 24.

Chinese Patent Application No. 20110246456.02, Office Action dated Nov. 5, 2012, 9 pages (including English Translation).

Chinese Patent Application No. 20110246456.02, Amendment dated Mar. 7, 2013, 11 pages (including English Translation of claims).

Chinese Patent Application No. 201102464562, Office Action dated Jul. 2, 2013, 8 pages (including English Translation).

Chinese Patent Application No. 201102464562, Amendment dated Sep. 10, 2013, 8 pages (including English Translation of claims).

* cited by examiner

MIRRORING DATA CHANGES IN A DATABASE SYSTEM

BACKGROUND

Currently, database systems are equipped with High Availability and Disaster Recovery (HADRON) features such that data and metadata stored on a primary database server are still accessible even if the primary database server becomes temporarily or permanently unavailable. In these database systems, the primary database server typically includes the original version of the data and the metadata that is accessed and modified by a user. A secondary database server is then used to mirror all of the activity that occurs on the data and metadata stored on the primary database server such that a copy of the altered data and metadata is stored on the secondary database server. As a result, if the primary database server becomes temporarily unavailable, the secondary database server, which includes data and metadata that closely resembles the primary database server, will be made available to the user. This feature is referred to as high availability.

In certain cases, the primary database server and the secondary database server may be located at different geographical locations such that the secondary database server will be preserved in the event that the primary database server is destroyed by a natural disaster or the like. In the case of such a disaster, since the primary database server may no longer be available, the secondary database server may be provided to take over the tasks of the primary database server. This feature is referred to as disaster recovery. For both features, high availability and disaster recovery, the database system mirrors the changes performed on the primary database server onto the secondary database server to ensure that the data and metadata stored in the primary database server is available to those requesting it.

The changes performed on the primary server may be made on the metadata of a database file and/or the data of a filesystem file. The metadata are stored in rows of the database file that is stored in a filesystem. The filesystem file is located in the same filesystem or a different filesystem as the database file. Currently, changes made to the metadata are logged in a database log file, but the changes made to the data in a filesystem file are not logged anywhere. In order to mirror the changes made to the metadata on the primary database server, a computer application sends the database log file to the secondary database server such that the secondary database server mirrors the changes indicated in the database log file. However, since the database log file does not include any information pertaining to the changes made to the data in the filesystem file on the primary database server, the secondary database server cannot mirror the changes made to the data on the primary database server because it does not know what data has changed. As such, the secondary database server copies the entire filesystem file to ensure that the changed data has been mirrored onto the secondary database. This method for updating the changes to the data in the file on the secondary server is an inefficient method for updating changes to data.

SUMMARY

Described herein are implementations of various technologies for mirroring data in a database system. In one implementation, a computer application stored on the primary database server may use a filesystem filter driver to intercept all operations that make changes to the data in a filesystem file on the primary database server. The filesystem filter driver may keep track of where the data changes in the filesystem file occur in a list that may include offset locations and lengths. The offset location may indicate the starting location of the data change in the filesystem file and the length of the data change in the filesystem file. The computer application may then receive the lists of offset locations and lengths from the filesystem filter driver such that it may output an efficient sequence of sending blocks of the data to the secondary database server.

After receiving the lists of offset locations and lengths, the computer application may merge information related to data changes that have nearby offset locations and lengths into a chunk. The computer application may then add the chunk as a log record into a database log block in a database log. After adding the chunks into the database log blocks, the computer application may read each database log block in the database log to determine whether any chunks are present in the corresponding database log block. For each identified chunk, the computer application may open the filesystem file associated with the chunk, read the data from the filesystem file that corresponds to the data of the chunk starting at the offset location for the length of the of data change. After reading the data that corresponds to the chunk, the computer application may send the read data and the database log block to the secondary database server.

A second computer application stored on the secondary database server may then receive the data and the database log block from the primary database server. The second computer application may replace the data stored on the secondary database's server with the received data such that the data on the secondary database server is identical to the data on the primary database server. The second computer application may then receive the database log block, which may indicate the changes made to the metadata on the primary server. The second computer application may then make the same changes to the corresponding metadata on the secondary database server.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In general, one or more implementations described herein are directed to mirroring data changes in a database system. By mirroring the data changes and the metadata changes in a primary database system onto a secondary database system, the data and the metadata stored on the primary database system may be available for High Availability and Disaster Recovery (HADRON) purposes. Various techniques for mirroring data changes in a database system will be described in more detail with reference to FIGS. 1-5.

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 1:
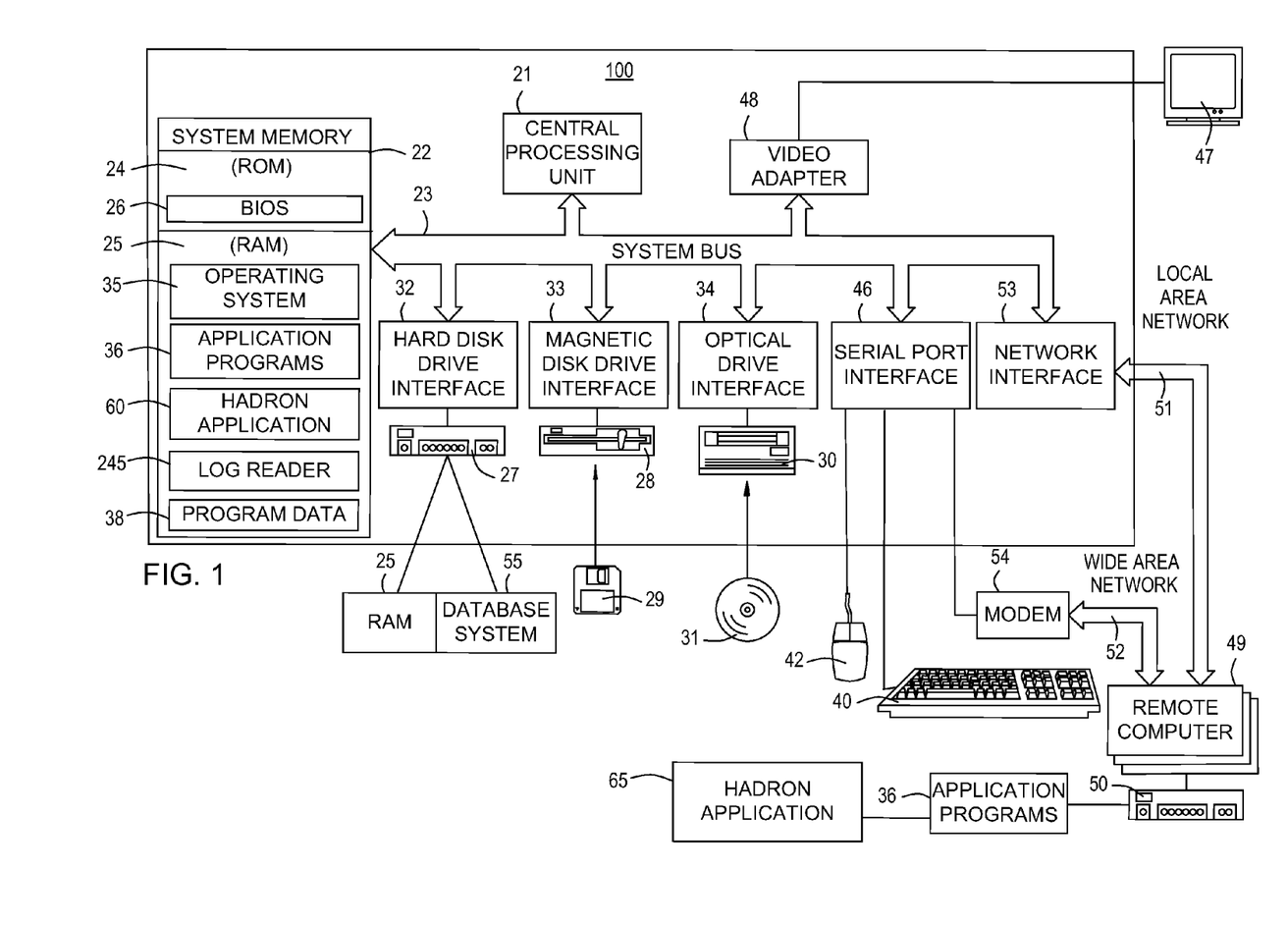
FIG. 1 illustrates a schematic diagram of a computing system in which the various techniques described herein may be incorporated and practiced.

FIG. 1 illustrates a schematic diagram of a computing system 100 in which the various technologies described herein may be incorporated and practiced. Although the computing system 100 may be a conventional desktop or a server computer, as described above, other computer system configurations may be used.

The computing system 100 may include a central processing unit (CPU) 21, a system memory 22 and a system bus 23 that couples various system components including the system memory 22 to the CPU 21. Although only one CPU is illustrated in FIG. 1, it should be understood that in some implementations the computing system 100 may include more than one CPU. The system bus 23 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 22 may include a read only memory (ROM) 24 and a random access memory (RAM) 25. A basic input/output system (BIOS) 26, containing the basic routines that help transfer information between elements within the computing system 100, such as during start-up, may be stored in the ROM 24.

The computing system 100 may further include a hard disk drive 27 for reading from and writing to a hard disk, a magnetic disk drive 28 for reading from and writing to a removable magnetic disk 29, and an optical disk drive 30 for reading from and writing to a removable optical disk 31, such as a CD ROM or other optical media. The hard disk drive 27, the magnetic disk drive 28, and the optical disk drive 30 may be connected to the system bus 23 by a hard disk drive interface 32, a magnetic disk drive interface 33, and an optical drive interface 34, respectively. The drives and their associated computer-readable media may provide nonvolatile storage of computer-readable instructions, data structures, program modules and other data for the computing system 100.

Although the computing system 100 is described herein as having a hard disk, a removable magnetic disk 29 and a removable optical disk 31, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk 27, magnetic disk 29, optical disk 31, ROM 24 or RAM 25, including an operating system 35, one or more application programs 36, a HADRON application 60, HADRON application 65, log reader 245, program data 38, and a database system 55. The operating system 35 may be any suitable operating system that may control the operation of a networked personal or server computer, such as Windows® XP, Mac OS® X, Unix-variants (e.g., Linux® and BSD®), and the like. HADRON application 60, HADRON application 65 and log reader 245 may be configured to manage the method for mirroring data changes on a primary database server and a secondary database server, respectively. HADRON application 60, HADRON application 65 and log reader 245 will be described in more detail with reference to FIGS. 2-5 in the paragraphs below.

A user may enter commands and information into the computing system 100 through input devices such as a keyboard 40 and pointing device 42. Other input devices may include a microphone, joystick, game pad, satellite dish, scanner, or the like. These and other input devices may be connected to the CPU 21 through a serial port interface 46 coupled to system bus 23, but may be connected by other interfaces, such as a parallel port, game port or a universal serial bus (USB). A monitor 47 or other type of display device may also be connected to system bus 23 via an interface, such as a video adapter 48. In addition to the monitor 47, the computing system 100 may further include other peripheral output devices such as speakers and printers.

Further, the computing system 100 may operate in a networked environment using logical connections to one or more remote computers 49. The logical connections may be any connection that is commonplace in offices, enterprise-wide computer networks, intranets, and the Internet, such as local area network (LAN) 51 and a wide area network (WAN) 52. The remote computers 49 may each include application programs 36 similar to that of the computer action function 60.

When using a LAN networking environment, the computing system 100 may be connected to the local network 51 through a network interface or adapter 53. When used in a WAN networking environment, the computing system 100 may include a modem 54, wireless router or other means for establishing communication over a wide area network 52, such as the Internet. The modem 54, which may be internal or external, may be connected to the system bus 23 via the serial port interface 46. In a networked environment, program modules depicted relative to the computing system 100, or portions thereof, may be stored in a remote memory storage device 50. It will be appreciated that the network connections shown are exemplary and other means of establishing a communications link between the computers may be used.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 2:
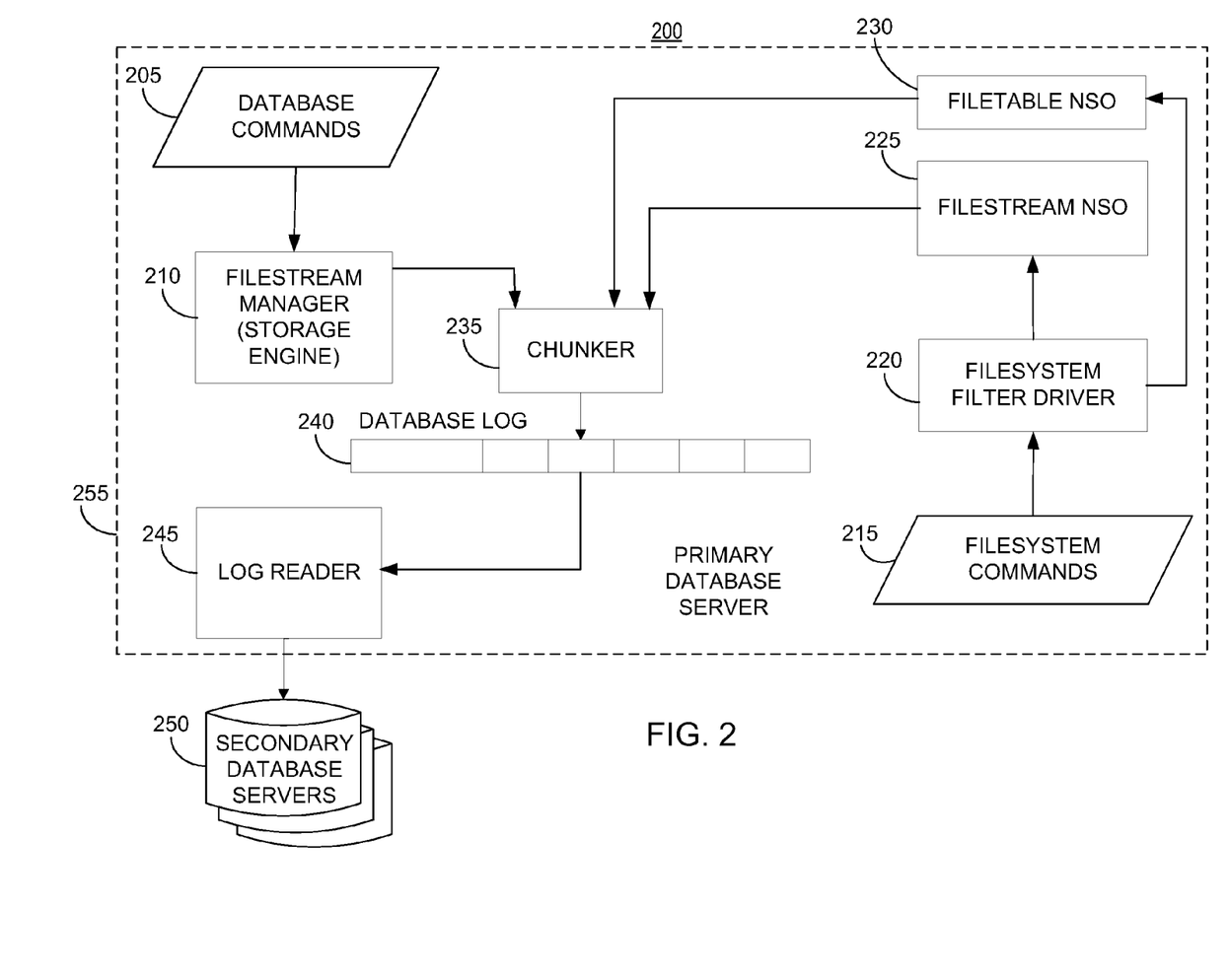
FIG. 2 illustrates a schematic diagram of a database system in which the various techniques described herein may be incorporated and practiced.

FIG. 2 illustrates a schematic diagram of a database system 200 in which various techniques described herein may be incorporated and practiced. The following description of database system 200 is made with reference to computing system 100 of FIG. 1. Database system 200 includes data information such as database commands 205 and filesystem commands 215. Database commands 205 may include database commands that may insert or update data stored on a filesystem file. In one implementation, database commands may include Transactional Structured Query Language (T-SQL) server commands. Similarly, filesystem commands 215 may include filesystem commands that open, write and close data stored on the filesystem file. In one implementation, filesystem commands may include Win32 write commands that make changes to data and have been opened and closed.

Database system 200 also includes various modules for performing parts of the process related to mirroring the data changes in a database system. The modules may include filestream manager 210, filesystem filter driver 220, filestream name space owner (NSO) 225, filetable name space owner (NSO) 230, chunker 235 and log reader 245. In one implementation, all of the modules may be part of HADRON application 60, as shown in computer system 100.

In one implementation, filestream manager 210 may intercept database commands 205 from a database stack. Database commands 205 may insert or update the data stored in the filesystem file. Similarly, filesystem filter driver 220 may intercept filesystem commands 215 from a filesystem stack. Filesystem commands 215 may write to data stored in the filesystem file. Filesystem filter driver 220 may be a kernel mode driver that may be used to detect changes made to the data. In addition to detecting whether changes were made to the data, filestream manager 210 and filesystem filter driver 220 may detect an offset location and length of each data change in the filesystem file. Although filestream manager 210 and filesystem filter driver 220 have been described as being used to detect information related to when data has been changed, it should be noted that filestream manager 210 and filesystem filter driver 220 may also be configured to perform other database and file system functions.

Filestream NSO 225 and filetable NSO 230 may be database system components such as SQL server components that may interact with filesystem filter driver 220. Filestream NSO 225 and filetable NSO 230 may also provide filesystem functionalities via filesystem filter driver 220. In one implementation, filestream NSO 225 may be used to store data outside database system 200, and filetable NSO 230 may be used to provide extended filesystem functionalities. If filesystem commands 215 include data changes that were accessed via a filestream or transactional access, filesystem filter driver 220 may send a notification about its intercepted data change to filestream NSO 225. Alternatively, if filesystem commands 215 include data changes that were accessed via a filesystem application (e.g., Win32 application), filesystem filter driver 220 may send a notification about the data change to filetable NSO 225.

Filestream manager 210, filestream NSO 225 and filetable NSO 230 may send information related to the data changes to chunker 235. Chunker 235 may analyze all of the data changes and coalesce or merge the data changes into a single chunk. After merging the data changes into a single chunk, chunker 235 may insert a log record into database log 240 to indicate that an update has occurred to the data in a particular filesystem file. The log record may include the offset location of the update in the filesystem file and the length that corresponds to the update. In this manner, all data changes and updates that occur in the filesystem file may be represented in database log 240. In one implementation, database log 240 may also include information related to any metadata changes that occurred on a database file in database system 200.

After the log records have been added to database log 240, log reader 245 may read each log block in database log 240 to determine whether the log block may contain a log record that has a chunk. For each identified chunk, log reader 245 may open the filesystem file associated with the identified chunk. Log reader 245 may then read the data in the filesystem file from the offset location and for the length defined in the log record. After reading the data, log reader 245 may send the read data to one or more secondary database servers 250.

Secondary database servers 250 may then replace the data that corresponds to the data sent from log reader 245 in its corresponding filesystem file. In this manner, secondary database servers 250 may be used to mirror database system 200 to provide data for high availability and disaster recovery purposes.

In one implementation, database system 200 may correspond to computer system 100. Database system 200 may be referred to as a primary database server. In this manner, the data changes made to the filesystem file stored on the primary database server may be mirrored on the secondary database servers 250. Although not shown in database system 200, the filesystem file may be stored in database system 200. Similarly, a corresponding filesystem file may be stored in secondary database server 250.

Figure 3:
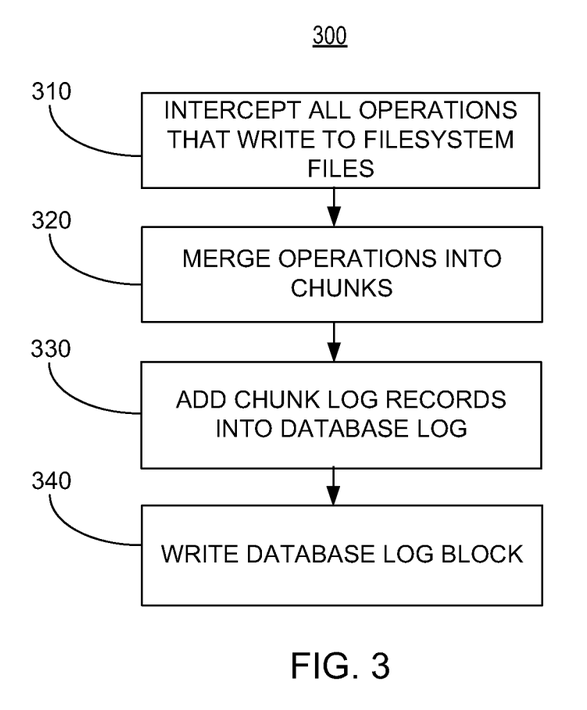
FIG. 3 illustrates a flow diagram of a method for tracking and recording data changes made in a primary database system in accordance with one or more implementations of various techniques described herein.

FIG. 3 illustrates a flow diagram of a method for tracking and recording data changes made in a primary database system in accordance with one or more implementations of various techniques described herein. The following description of method 300 is made with reference to computing system 100 of FIG. 1 and database system 200 of FIG. 2. It should be understood that while method 300 indicates a particular order of execution of the operations, in some implementations, certain portions of the operations might be executed in a different order. In one implementation, method 300 may be performed by HADRON application 60.

At step 310, HADRON application 60 may intercept all operations that change data to a filesystem file. In one implementation, HADRON application 60 may use filestream manager 210 to intercept the database commands such as T-SQL inserts and updates that change data in the filesystem file. Similarly, HADRON application 60 may use filesystem filter driver 220 to intercept filesystem commands that open, write and close data in the filesystem file.

In one implementation, when HADRON application 60 intercepts an operation that makes a change to data in the filesystem file, HADRON application 60 may keep track of the change by maintaining a list of the offset location and length of each data change. For instance, a data change in a filesystem file may occur at offset 1000 for length 100.

At step 320, HADRON application 60 may merge the offset locations and lengths for each operation that makes a change to the data into a chunk. By merging the offset locations and the lengths, HADRON application 60 may combine data changes that occurred on nearby or overlapping data into a single data change. For instance, if a first data change occurs at offset 1000 for length 500 and a second data change occurs at offset 1500 for length 500, HADRON application 60 may merge these two data changes into a single data change represented by offset 1000 for length 1000. Similarly, HADRON application 60 may merge nearby data changes that have been received out of order. For instance, a first data change may be represented by offset 1000 for length 500, a second data change may be represented by offset 2000 for length 500 and a third data change may be represented by offset 1500 for length 500. HADRON application 60 may merge these three disjoint data change operations into a single data change at offset 1000 for length 1500. In another example, HADRON application 60 may merge overlapping data changes. For instance, a first data change may be represented by offset 1000 for length 500 and a second data change may be represented by offset 1200 for length 800. HADRON application 60 may merge these three disjoint data change operations into a single data change at offset 1000 for length 1000. By merging the data changes into a single data change, HADRON application 60 may minimize the number of times data may be sent to a secondary database server.

In one implementation, HADRON application 60 may wait for a predetermined amount of time or for a predetermined amount of data before merging the data changes. In this manner, HADRON application 60 may merge all of the data changes that occur during the predetermined amount of time or for the predetermined amount of data together. Steps 320-330 described above may be performed by filestream NSO 225, filetable NSO 230 and filestream manager 210 as described in FIG. 2.

At step 330, HADRON application 60 may add the chunk containing the merged offset locations and lengths into a database log as a log record. At step 340, HADRON application 60 may write the database log by writing database log blocks. A database log block may include a group of consecutively added log records. In one implementation, after writing the database log block, HADRON application 60 send the database log blocks to log reader 245. Steps 330-340 may be performed by chunker 235 as described in FIG. 2.

Figure 4:
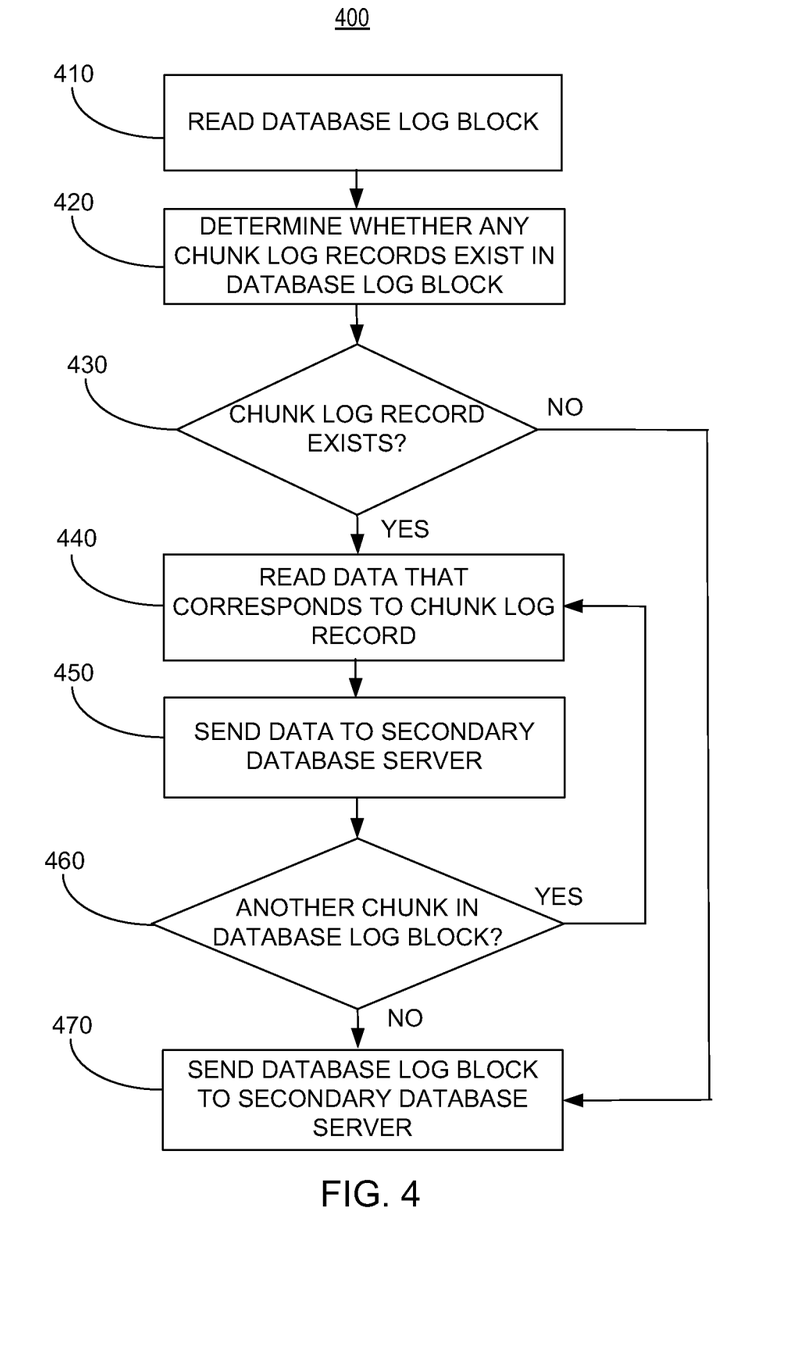
FIG. 4 illustrates a flow diagram of a method for sending data changes made in a primary database system to a secondary database system in accordance with one or more implementations of various techniques described herein.

FIG. 4 illustrates a flow diagram of a method for sending data changes made in a primary database system to a secondary database system in accordance with one or more implementations of various techniques described herein. The following description of method 400 is made with reference to computing system 100 of FIG. 1 and database system 200 of FIG. 2. It should be understood that while method 400 indicates a particular order of execution of the operations, in some implementations, certain portions of the operations might be executed in a different order. In one implementation, method 400 may be performed by log reader 245.

At step 410, log reader 245 may read a database log block from HADRON application 60. In one implementation, HADRON application 60 may receive the database log block from the chunker 235. After reading a database log block, at step 420, log reader 245 may determine whether a log record related to a chunk exists in the database log block. If the database log block includes a chunk log record, log reader 245 may proceed to step 440. If, however, the database log block does not include a chunk log record, log reader 245 may proceed to step 470.

At step 440, log reader 245 may read the data in the filesystem file that corresponds to the data described in the chunk log record. For instance, if the chunk log record indicated that data at offset 1000 and length 500 was changed, log reader 245 may read the data in the filesystem file that corresponds to the chunk log record at offset 1000 and length 500.

At step 450, log reader 245 may send the read data to secondary database server 250. At step 460, log reader 245 may determine whether another chunk log record exists in the database log block. If another chunk log record exists in the database log block, log reader 245 may return to step 440. If, however, another chunk log record does not exist in the database log block, log reader 245 may proceed to step 470. At step 470, log reader 245 may send the database log block to secondary database server 250.

Figure 5:
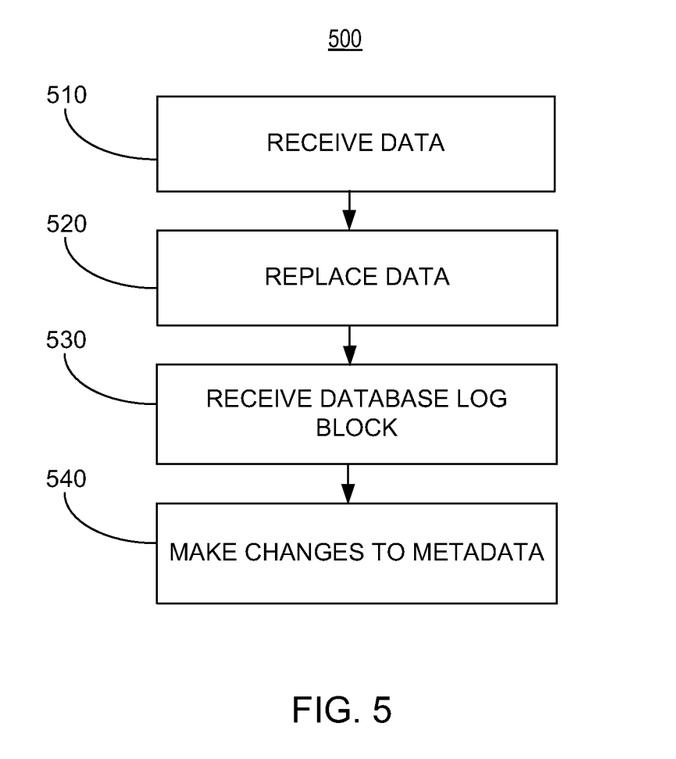
FIG. 5 illustrates a flow diagram of a method for making data changes on a secondary database system to mirror data changes made in a primary database system in accordance with one or more implementations of various techniques described herein.

FIG. 5 illustrates a flow diagram of a method for making data changes on a secondary database system to mirror data changes in a primary database system in accordance with one or more implementations of various techniques described herein. The following description of method 500 is made with reference to computing system 100 of FIG. 1 and database system 200 of FIG. 2. It should be understood that while method 500 indicates a particular order of execution of the operations, in some implementations, certain portions of the operations might be executed in a different order. In one implementation, method 400 may be performed by HADRON application 65 stored on a secondary database server 250.

At step 510, HADRON application 65 may receive data sent from log reader 245, as described in step 450. At step 520, HADRON application 65 may search for the data that corresponds to the received data and replace the data on the secondary database server 250 with the received data. In this manner, the data associated with the chunk log record (i.e., offset location and length) may replace the corresponding data in the secondary database server 250.

At step 530, HADRON application 65 may receive the database log block sent from log reader 245. At step 540, HADRON application 65 may interpret the database log block to determine whether any changes were made to metadata stored on the primary database server. If changes to the metadata were made, the database log block may indicate what those changes were and HADRON application 65 may make those same changes to the corresponding metadata in the secondary database server 250.

In one implementation, methods 300, 400 and 500 may be performed in a synchronous mode such that the data change operation may be complete when all appropriate secondary database servers have updated its data to mirror the data change operation. In this manner, there may be a strong guaranty of little or no data loss during a disaster recover event.

Alternatively, methods 300, 400 and 500 may be performed in an asynchronous mode such that there may be a delay between when the data change operation commits on the primary database server and when the corresponding data change commits on the secondary database servers. An asynchronous mode of operation may provide for better performance, which may result in data being more highly available during normal operations.

In any case, methods 300, 400 and 500 allow data changes to be mirrored on secondary database servers 250 more efficiently because only the data being changed in the filesystem file stored on the primary database server is sent to secondary database servers 250, as opposed to sending the entire filesystem file. By only sending the relevant data, database systems may be better equipped to provide data for high availability and disaster recovery purposes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for mirroring one or more data changes from a first database server to one or more second database servers, comprising:
   by the first database server, intercepting two or more operations that each make a change to data of a particular file stored on the first database server, wherein one of the operations is a filesystem command intercepted from a file system stack and one of the operations is a database command intercepted from a database stack;
   by the first database server, detecting an offset location and length of each data change;
   by the first database server, analyzing the offset location and length of each data change to the particular file to merge the data changes of the filesystem command operation and the database command operation into a single data change having a merged offset location and merged length, the single data change comprising a chunk;
   by the first database server, adding the chunk into a database log, the database log having one or more database log blocks;
   storing metadata associated with the particular file in a database;
   adding information related to a change to the metadata to a database log block of the database log; and
   writing the database log blocks by the first database server.

2. The method of claim 1, wherein the operations are intercepted by a filter driver.

3. The method of claim 2, wherein the filter driver is a kernel mode driver configured to detect the changes.

4. The method of claim 1, wherein the operation from the file system stack comprises one of open, write or close operation on the data.

5. The method of claim 1, wherein the change to the metadata comprises an insert or an update operation on the metadata.

6. The method of claim 1, wherein intercepting the operations comprises:
   detecting the operations that make the changes; and
   sending the offset location and the length for each change to a chunker.

7. The method of claim 6, wherein the data changes are merged by the chunker.

8. The method of claim 1, wherein merging the data changes comprises combining a subset of the operations, wherein the subset of the operations comprises two or more data changes, wherein each data change in the subset occurs overlapping data.

9. The method of claim 1, wherein merging the data changes comprises combining the operations, wherein the operations comprise data changes occurring in adjacent data.

10. The method of claim 1, wherein the data changes are merged after a predetermined amount of time.

11. The method of claim 1, wherein the data changes are merged for a predetermined amount of data.

12. The method of claim 1, further comprising sending the database log blocks to the second database servers.

13. The method of claim 12, wherein sending the database log blocks comprises:
   (a) determining whether one of the database log blocks includes one of the log records having the chunks; and
   (b) if the one of the database log blocks includes the one of the log records, then sending data that corresponds to the one of the log records to the second database servers.

14. The method of claim 13, further comprising repeating steps (a)—(b) for each database log block.

15. A database management system, comprising:
   a filesystem filter driver configured to intercept one or more filesystem operations that make one or more changes to one or more data on a first database server, wherein the filesystem operations comprise file system commands intercepted from a file system stack;
   a filestream manager configured to intercept one or more database operations that make one or more changes to the data, wherein the database operations comprise database commands intercepted from a database stack;
   a chunker of the first database server configured to:
      merge the filesystem operations and the database operations into a single data change comprising a chunk;
      add one or more log records having the chunk into a database log; and
      write one or more database log blocks of the database log, wherein the chunker is configured to:

analyze the information to determine an offset location and a length for each change made by each filesystem operation and each database operation; and merge two or more offset locations and two or more lengths into a single data change having a merged offset location and merged length, wherein the two or more offset locations and the two or more lengths are adjacent to or overlapping with each other;

a log reader configured to:
  read the database log blocks;
  determine whether one of the database log blocks in the database log includes one of the log records having the chunk; and
  if the one of the database log blocks includes the one of the log records, then send data that corresponds to the one of the log records to one or more second database management systems.

16. The database management system of claim 15, further comprising:
one or more database components configured to:
  receive one or more notifications pertaining to the intercepted filesystem operations; and
  send the notifications to the chunker, wherein the notifications comprise information related to the filesystem operations and the database operations.

* * * * *